United States Patent Office 2,813,915
Patented Nov. 19, 1957

2,813,915

PRODUCTION OF 1,2,3,4,7,7-HEXACHLORO-BICYCLO[2.2.1]-2,5-HEPTADIENE

Jeremiah M. Howald and Clifford D. Marshall, Houston, Tex., assignors to Shell Development Company, New York, N. Y., a corporation of Delaware No Drawing. Application August 10, 1955,
Serial No. 527,633

14 Claims. (Cl. 260—648)

This invention relates to the production of 1,2,3,4,7,7-hexachlorobicyclo[2.2.1]-2,5-heptadiene. The invention relates more particularly to an improved method enabling the more efficient production of a normally liquid reaction product consisting essentially of 1,2,3,4,7,7-hexachlorobicyclo[2.2.1]-2,5-heptadiene from readily available starting materials comprising hexachlorocyclopentadiene and acetylene.

1,2,3,4,7,7 - hexachlorobicyclo[2.2.1]-2,5-heptadiene, to the more efficient production of which the present invention is directed, is a normally liquid product having a boiling temperature of about 112° C. at 6 mm. Hg, and a freezing temperature of about 0° C. It is of importance as a starting or intermediate material in the production of valuable chemical derivatives therefrom. It is of particular value in the preparation of insecticides. Methods available heretofore directed to its production in a state of purity defined by practical utility, generally depend upon procedures involving a plurality of operative steps. Difficulties often inherent in the execution of such relatively complex procedures generally render difficult the maintenance of uniform product purity and of yields and costs commensurate with practical scale operation.

It is, therefore, an object of the present invention to provide an improved process enabling the more efficient production of 1,2,3,4,7,7-hexachlorobicyclo[2.2.1]-2,5-heptadiene.

Another object of the present invention is the provision of an improved process enabling the more efficient production of a reaction product which is normally liquid, has a boiling temperature of about 112° C. at 6 mm. Hg, and consists essentially of 1,2,3,4,7,7-hexachlorobicyclo[2.2.1]-2,5-heptadiene, with a minimum of operative procedure from readily available source materials.

A specific object of the invention is the provision of an improved process enabling the more efficient production of a normally liquid reaction product, having a boiling temperature of about 112° C. at 6 mm. Hg, by the direct, single-stage interaction of reactants comprising hexachlorocyclopentadiene and acetylene. Other objects and advantages of the invention will become apparent from the following detailed description thereof.

Efforts to produce the desired reaction product, consisting essentially of 1,2,3,4,7,7-hexachlorobicyclo[2.2.1]-2,5-heptadiene, by the direct reaction of hexachlorocyclopentadiene with acetylene have heretofore been unsuccessful. The extent to which these materials will interact, and the nature of the products obtained, are found to be influenced markedly by variations in individual factors comprised in the prevailing operating conditions employed. At relatively mild conditions involving the use of low temperatures and pressures, interaction of these materials will generally not take place even with prolonged contact time. Raising the pressure will alone not result in interaction with the formation of the desired 1,2,3,4,7,7-hexachlorobicyclo[2.2.1]-2,5-heptadiene.

*Example I*

Hexachlorocyclopentadiene was introduced into a reactor. Acetylene was bubbled through the liquid hexachlorocyclopentadiene at room temperature until the hexachlorocyclopentadiene was saturated with acetylene and the free space above the liquid consisted of acetylene. The reactor was then sealed and allowed to stand for four days. The reactor was then opened and the contents subjected to infrared analysis.

The operation was repeated under substantially identical conditions with the exception that the reactor was subjected to an acetylene pressure of 20 atmospheres before being sealed.

In neither run was 1,2,3,4,7,7-hexachlorobicyclo-[2.2.1]-2,5-heptadiene found to be present in detectable amounts.

The hazardous nature of the starting materials precludes the use of exceedingly severe conditions of high temperatures and pressures in the absence of safeguards known not to suppress the formation of the desired reaction product. The use of relatively moderate conditions, although resulting in a certain amount of interaction between the initial reactants, generally results in a product which is in nowise the equivalent of the desired normally liquid reaction product consisting essentially of 1,2,3,4,7,7 - hexachlorobicyclo[2.2.1]-2,5 - heptadiene. Subsequent study revealed the relative instability of the desired reaction product under certain conditions conducive to its formation. The undesired reaction products, generally obtained at certain relatively moderate operating conditions, are therefore believed to be attributable at least in part to side reactions involving the formation of the desired 1,2,3,4,7,7-hexachlorobicyclo-[2.2.1]-2,5-heptadiene as an unstable intermediate product which, under the conditions of its formation, unavoidably undergoes further reaction with the formation of undesired materials which often prove to be high boiling and often even normally solid.

*Example II*

A tubular reactor having a volume of 190 cc. was charged with 0.5 mole hexachlorocyclopentadiene. Acetylene was introduced and the reactor brought to a pressure of 40 p. s. i. g. by acetylene pressure. Heat was applied and further amounts of acetylene were introduced until the reactor attained a pressure of 100 p. s. i. and a temperature of 180 ° C. over a period of four hours. The reactor was then maintained at this temperature for one hour. At the end of this period the reactor was opened and the products analyzed. Infrared analysis indicated no presence of a detectable amount of the desired 1,2,3,4,7,7-hexachlorobicyclo[2.2.1]-2,5-heptadiene. A viscous black residue remained after distilling unconverted hexachlorocyclopentadiene from the reactor contents. Eighty percent of the hexachlorocyclopentadiene charge was recovered. On recrystallizing the dark residue from hexane and carbon tetrachloride a normally solid crystalline product was obtained melting with decomposition at 332 to 338° C. The infrared spectrum of this product was that of perchlorofulvalene ($C_{10}Cl_8$) and was found to have the following composition upon analysis:

Percent Cl _____ 72.41
Percent C _____ 27.51
Percent H _____ 0.00

It has now been found that the desired normally liquid reaction product consisting essentially of 1,2,3,4,7,7-hexachlorobicyclo[2.2.1]-2,5-heptadiene is produced efficiently with a minimum of operative procedure directly from hexachlorocyclopentadiene and acetylene by effecting the interaction of the hexachlorocyclopentadiene and acetylene under a well-defined correlation of conditions of elevated temperature, pressure and time of contact.

In accordance with the process of the invention, the desired reaction product is obtained by reacting acetylene with hexachlorocyclopentadiene under correlated conditions of temperature, pressure and contact time defined by the equation:

$$(P-100)+(T-125)+\frac{M+60}{2}=K \qquad (I)$$

wherein P is a pressure in pounds per square inch gauge of at least about 100 p. s. i. g., T is a temperature in the range of from about 100 to about 185° C., M a time of contact in minutes, and K is a whole number having a minimum value of 250.

Hexachlorocyclopentadiene employed as charge to the process of the invention may be obtained from any suitable source. It may be obtained, for example, by pyrolytic treatment of the octachlorocyclopentene-containing reaction products resulting from the chlorination of cyclopentadiene as described and claimed in copending application Serial No. 190,194, filed October 14, 1950. The hexachlorocyclopentadiene charge need not be pure and may comprise, for example, materials which are inert under the conditions of execution of the raction. It is, however, preferably substantially free of any materials which are not readily separable from 1,2,3,4,7,7-hexachlorobicyclo[2.2.1]-2,5-heptadiene or which otherwise render difficult recovery of the desired reaction product.

Although in the preferred method of carrying out the process of the invention the acetylene reactant is introduced into the system in relatively pure form, the presence therein of materials, such as, for example, normally gaseous and inert materials, is comprised within the scope of the invention. Small amounts of impurities normally encountered in commercial acetylene such as, for example, acetone, may be present.

Essential to the attainment of the objects of the invention is the maintenance of the temperature at which the reaction is executed in the range of from about 100 to about 185° C., and preferably from about 125 to about 175° C. At temperatures below the defined range yield of the desired normally liquid products is generally substantially below that commensurate with practical scale operation. The relative instability of the desired reaction product at temperatures above the defined range usually results in the obtaining of reaction mixtures comprising substantial amounts of by-products. A particularly suitable method of operation comprises the use of a progressively decreasing temperature within the above-defined range during the course of the operation. In continuous operation a decreasing temperature gradient may be maintained through the reaction zone in the direction of flow. The use of the progressively decreasing temperature gradient enables the obtaining of maximum yields with a minimum of by-product formation.

The reaction resulting in the obtaining of the desired 1,2,3,4,7,7-hexachlorobicyclo[2.2.1]-2,5-heptadiene is carried out at a pressure in excess of about 100 p. s. i. Suitable pressures comprise those in the range of from about 175 to about 500 p. s. i. Higher pressures may, however, be employed within the scope of the invention; the maximum pressure for a specific operation being defined by the behavior characteristics of the acetylene with respect to stability under the conditions employed.

Specific temperatures and pressures within the above-defined ranges employed in the execution of the process of the invention are further limited by the restrictions imposed by the foregoing Formula I wherein K has a minimum value of 250 and a maximum value of about 1500. Somewhat higher values of K may, however, be resorted to within the scope of the invention. Thus, production of the desired reaction product may be carried out under conditions of greater freedom with regard to pressure and time of contact than of temperature.

In general it has been found that the use of a contact time of, for example, at least 60 minutes and up to about 60 hours is satisfactory. Higher or lower contact times within the confines of conditions permitted by the foregoing Formula I may, however, be employed within the scope of the invention.

It is to be stressed that the production of 1,2,3,4,7,7-hexachlorobicyclo[2.2.1]-2,5-heptadiene in accordance with the invention is carried out under conditions of pressure, temperature and contact time defined by the foregoing Formula I. The suitable contact time is, therefore, that during which the reactants are at the specific temperature and pressure conditions defined by the Formula I. The range of permissible contact time does not include the bringing of the reaction system to the process conditions defined by the foregoing Formula I.

The process of the invention may be carried out in batch, semicontinuous or continuous operation. The reaction zone may comprise one or more suitable zones of enlarged cross-sectional area, such as, for example, a reactor or chamber, and/or a reaction zone of restricted cross-sectional area such as, for example, a tubular reactor, a coil, etc. The hexachlorocyclopentadiene is introduced into the reaction zone in the liquid phase. The acetylene charge may be introduced directly into the reaction zone or admixed, at least in part, with the liquid stream of hexachlorocyclopentadiene passing to the reaction zone.

Without intent to limit in any wise the scope of the present invention by theory advanced herein to set forth more fully the nature thereof, it is believed that the reaction leading to the desired normally liquid product consisting essentially of 1,2,3,4,7,7-hexachlorobicyclo[2.2.1]-2,5-heptadiene proceeds essentially in the liquid phase of the system. Accordingly, it is preferred to effect the reaction under conditions favoring the solution, or intimate contact, of the acetylene charge with the liquid hexachlorocyclopentadiene present in the liquid phase. The type of apparatus and method of operation employed in executing the process of the invention are preferably those assuring a minimum of vapor phase within the reaction zone. Any vapor space within the reaction zone may be packed with suitable inert packing material to reduce the amount of free space. Suitable methods of operation assuring intimate contact of the reactants is brought about, for example, by bubbling the acetylene charge through the hexachlorocyclopentadiene-containing liquid phase under conditions assuring substantial saturation of the liquid phase with acetylene throughout the course of the operation. A preferred type of reaction zone comprises, for example, an elongated tubular or tower type of reactor enabling the upward passage of the acetylene charge through a hexachlorocyclopentadiene-containing liquid phase maintained therein.

The reactants are preferably agitated during the course of the reaction. Suitable agitation is obtained, for example, by such expedients as: the use of stirrers; the injection of acetylene, optionally admixed with additional inert gaseous or vaporized diluent into the reaction mixture; the cycling of admixed reactants through an elongated passage comprised within the reaction zone; etc.

Suitable means are provided for the maintenance of the reactants at the desired reaction conditions of temperature, pressure and time of contact set forth hereinabove. A part, or all, of the hexachlorocyclopentadiene charge to the system may be preheated prior to its introduction into the reaction zone, and the preheating may be controlled to aid in maintaining the desired reaction temperature. Additional liquid media which are substantially inert under the conditions of execution of the reaction, may be employed to maintain the desired temperature conditions during the course of the operation.

Introduction of the acetylene charge into the reaction zone may be carried out in a manner directed to obtain intimate contact of the acetylene with the hexachlorocyclopentadiene under the reaction conditions. Acetylene may be injected into the reaction zone at a plurality of points thereof. Solvents, or materials functioning as solutizers, for acetylene may be employed within the scope of the invention. When employing a reaction zone comprising more than one reaction chamber, tubular reactor, coil or the like in series flow, acetylene charge may be introduced into one or more such component members of the reaction zone.

Under the above-defined conditions, acetylene will react with hexachlorocyclopentadiene to form reaction products comprising normally liquid 1,2,3,4,7,7-hexachlorobicyclo[2.2.1]-2,5-heptadiene having a boiling temperature of about 112° C. at 6 mm. Hg.

The reaction mixture obtained is passed from the reaction zone to suitable product recovery means directed to the recovery of the desired 1,2,3,4,7,7-hexachlorobicyclo-[2.2.1]-2,5-heptadiene, unreacted hexachlorocyclopentadiene and acetylene. Such recovery means may comprise one or more such steps as, for example, distillation, crystallization, filtration, solvent extraction, chromatographic adsorption, etc. Unconverted hexachlorocyclopentadiene and acetylene are preferably recycled to the reaction zone. Solvents when employed in the process may be recycled from the product recovery means to the reaction zone as a separate stream or in admixture with unconverted reactants.

In a modification of the process comprised within the scope of the presently claimed invention, a part of the reaction mixture emanating from the reaction zone in a continuous operation may be recycled to the reaction zone substantially as such and only the remainder of the reaction zone effluence passed to the product recovery means.

*Example III*

Acetylene was reacted with hexachlorocyclopentadiene under conditions which though moderately severe still fall outside of the conditions defined by the foregoing Formula I defining the conditions of the process of the invention. In the operation liquid hexachlorocyclopentadiene and acetylene were charged to a nickel reactor maintained at 110° C. and under an acetylene pressure of 147 p. s. i. g. for a period of 5.5 hours. Intimate contact of the reactants was effected by agitation by means of a Mag-Mix assembly. The vapor space of the reactor was packed with ceramic Raschig rings. Upon completion of the run, analysis of the products by infrared indicated the presence of no more than 2% of 1,2,3,4,7,7-hexachlorobicyclo[2.2.1]-2,5-heptadiene based on hexachlorocyclopentadiene charged.

*Example IV*

In three separate operations the operation of the foregoing Example III was repeated under substantially the same conditions but with the exception that conditions of temperature, pressure and contact time were employed which fall within the range defined by the foregoing Formula I setting forth the permissible conditions for the presently claimed invention. The specific conditions of temperature, pressure and contact time employed in each of the three operations, together with the yield of the desired normally liquid 1,2,3,4,7,7 - hexachlorobicyclo-[2.2.1]-2,5-heptadiene obtained, are indicated in the following table:

| Run No. | 1 | 2 | 3 |
|---|---|---|---|
| Temperature, ° C | 150 | 150 | 150 |
| Time, Hrs | 7.5 | 17 | 17.5 |
| Acetylene Pressure, p. s. i. g | 265 | 260-290 | 290-300 |
| Remarks | Stirred | Quiescent | Stirred |
| Yield of 1,2,3,4,7,7-hexachlorobicyclo-[2.2.1]-2,5-heptadiene on hexachlorocyclopentadiene charged, percent | 56 | 63 | 76 |

*Example V*

Acetylene was reacted with hexachlorocyclopentadiene in a nickel alloy reactor. 0.155 mole of the hexachlorocyclopentadiene was charged to the nickel alloy reactor having a capacity of 250 ml. The vapor space of the reactor was filled with ceramic Raschig rings. Acetylene was charged to the liquid hexachlorocyclopentadiene-containing reactor, and the reactor thus brought to an acetylene pressure of 265 p. s. i. g. The contents of the reactor were brought to a temperature of 180° C. and heated for a period of 7 hours while the temperature was progressively reduced to 150° C. At the end of this period the reactor was cooled and its contents analyzed. A conversion of hexachlorocyclopentadiene to 1,2,3,4,7,7-hexachlorobicyclo[2.2.1]-2,5-heptadiene of 84% with a yield of 75%, based upon hexachlorocyclopentadiene charged, was obtained. The product obtained was normally liquid, had a boiling temperature of about 112° C. at 6 mm. Hg and is believed to be represented by the following formula:

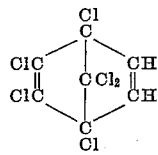

*Example VI*

1,2,3,4,7,7-hexachlorobicyclo[2.2.1]-2,5-heptadiene was prepared by reacting hexachlorocyclopentadiene with acetylene in a nickel alloy reactor. The reactor was pressured to 265 p. s. i. g. by acetylene introduction. When at this pressure the reactor contents were maintained at a temperature of 160° C. for 7 hours. A conversion of hexachlorocyclopentadiene to normally liquid 1,2,3,4,7,7-hexachlorobicyclo[2.2.1]-2,5-heptadiene of 82%, with a yield of 81% was obtained based upon hexachlorocyclopentadiene charged.

*Example VII*

In three separate operations normally liquid 1,2,3,4,7,7-hexachlorobicyclo[2.2.1]-2,5-heptadiene was prepared by bubbling acetylene through hexachlorocyclopentadiene in a tubular nickel alloy reactor. A high liquid level was maintained in the reactor. The temperature, pressure and time of contact maintained throughout the course of each operation, as well as the results obtained in terms of hexachlorocyclopentadiene conversion and yield of normally liquid 1,2,3,4,7,7-hexachlorobicyclo[2.2.1]-2,5-heptadiene based upon hexachlorocyclopentadiene converted, are indicated in the following table:

| Run No. | A | B | C |
|---|---|---|---|
| Temperature, ° C | 155 | 175 | 155 |
| Time, Hrs | 18 | 5 | 6 |
| Pressure, p. s. i. g | 265 | 265 | 300 |
| Hexachlorocyclopentadiene conversion, percent | 89 | 86 | 59 |
| Yield of 1,2,3,4,7,7-hexachlorobicyclo[2.2.1]-2,5-heptadiene, percent | 94 | 80 | 95 |

*Example VIII*

1,2,3,4,7,7 - hexachlorobicyclo[2.2.1]-2,5-heptadiene is prepared by bubbling acetylene through a liquid pool of hexachlorocyclopentadiene in a tubular nickel reactor at a temperature of 165° C. and a pressure of 380 p. s. i. g. for a period of 7 hours. A yield of 1,2,3,4,7,7-hexachlorobicyclo[2.2.1]-2,5-heptadiene of 80% is obtained based upon hexachlorocyclopentadiene charged.

We claim as our invention:

1. The process for the production of a reaction mixture comprising a normally liquid reaction product having a boiling temperature of about 112° C. at 6 mm. Hg and consisting essentially of 1,2,3,4,7,7-hexachlorobicyclo-[2.2.1]-2,5-heptadiene, which comprises reacting hexachlorocyclopentadiene with acetylenic hydrocarbons consisting essentially of acetylene at a temperature in the range of from about 100 to about 185° C. at a pressure above 100 p. s. i. g. and with a contact time defined by the formula $$(P-100)+(T-125)+\frac{M+60}{2}=K$$

wherein P is a pressure in pounds per square inch gauge above 100 lbs., T is a temperature in degrees centigrade in the range of from about 100 to about 185° C., M is the time of contact in minutes, and K is a positive number having a value of at least 250.

2. The process in accordance with claim 1 wherein said pressure, P, is in the range of from about 175 to about 500 p. s. i. g.

3. The process in accordance with claim 1 wherein the value of K is in the range of from 250 to 1500.

4. The process in accordance with claim 1 wherein the temperature is progressively decreased within said defined range during the course of said process.

5. The process for the production of a reaction mixture comprising a normally liquid reaction product having a boiling temperature of about 112° C. at 6 mm. Hg and consisting essentially of 1,2,3,4,7,7-hexachlorobicyclo-[2.2.1]-2,5-heptadiene, which comprises reacting hexachlorocyclopentadiene with acetylenic hydrocarbons consisting essentially of acetylene at a temperature in the range of from about 125° C. to about 175° C. at a pressure above 100 p. s. i. g. and with a contact time defined by the formula $$(P-100)+(T-125)+\frac{M+60}{2}=K$$

wherein P is a pressure in pounds per square inch gauge above 100 lbs., T is a temperature in degrees centigrade in the range of from about 125 to about 175° C., M is the time of contact in minutes, and K is a positive number having a value of at least 250.

6. The process in accordance with claim 5 wherein said pressure, P, is in the range of from about 175 to about 500 p. s. i. g.

7. The process in accordance with claim 5 wherein the value of K is in the range of from 250 to 1500.

8. The process in accordance with claim 5 wherein the temperature is progressively decreased within said defined range during the course of said process.

9. The process for the production of a normally liquid reaction product having a boiling temperature of about 112° C. at 6 mm. Hg and consisting essentially of 1,2,3,4,7,7-hexachlorobicyclo[2.2.1] - 2,5 - heptadiene, which comprises reacting hexachlorocyclopentadiene with acetylene at a temperature in the range of from about 125° C. to about 175° C., at a pressure of from about 175 to about 500 p. s. i. g., with a contact time defined by the formula $$(P-100)+(T-125)+\frac{M+60}{2}=K$$

wherein P is a pressure in pounds per square inch gauge of from about 175 to about 500 lbs., T is a temperature in the range of from about 125 to about 175° C., M is the time of contact in minutes, and K is a positive number having a value in the range of from 250 to about 1500, and separating a normally liquid product having a boiling temperature of about 112° C. at 6 mm. Hg and consisting essentially of 1,2,3,4,7,7-hexachlorobicyclo-[2.2.1]-2,5-heptadiene from the resulting reaction mixture.

10. The process in accordance with claim 9 wherein a progressively decreasing temperature gradient within said defined temperature range is maintained throughout the course of said process.

11. The process for the production of 1,2,3,4,7,7-hexachlorobicyclo[2.2.1]-2,5-heptadiene which comprises reacting hexachlorocyclopentadiene with acetylene at a temperature of from about 100 to about 185° C., a pressure of from about 325 to about 1000 p. s. i. g., with a contact time of at least 60 minutes, and separating a product consisting essentially of 1,2,3,4,7,7-hexachlorobicyclo[2.2.1]-2,5-heptadiene from the resulting reaction mixture.

12. The process in accordance with claim 11 wherein said pressure is maintained in the range of from about 325 to about 500 p. s. i. g.

13. The process in accordance with claim 11 wherein said temperature is maintained in the range of from about 125 to about 175° C.

14. The process in accordance with claim 11 wherein the temperature is decreased progressively within said defined temperature range during the course of the process.

References Cited in the file of this patent

FOREIGN PATENTS 498,176     Belgium _____ Oct. 14, 1950